United States Patent [19]

Schmidt, Jr.

[11] 4,446,030

[45] May 1, 1984

[54] LIQUID CIRCULATION AND PRESSURE TANKS

[75] Inventor: Henry Schmidt, Jr., Hinsdale, Ill.

[73] Assignee: Industrial Filter & Pump Mfg. Co., Cicero, Ill.

[21] Appl. No.: 115,343

[22] Filed: Jan. 25, 1980

[51] Int. Cl.³ .......................................... B01D 29/42
[52] U.S. Cl. .................... 210/805; 210/120; 210/127; 210/332; 261/77; 261/DIG. 75
[58] Field of Search .............. 210/68, 73 R, 74, 120, 210/121, 127, 188, 218, 221 P, 456, 472, 332, 333, 323 T, 805; 261/77, DIG. 75

[56] References Cited

U.S. PATENT DOCUMENTS

| | | | |
|---|---|---|---|
| 2,570,132 | 10/1951 | Koodal | 210/323 T |
| 2,784,846 | 3/1957 | Olson et al. | 210/456 X |
| 3,208,596 | 9/1965 | Graveat | 210/307 |
| 3,353,676 | 11/1967 | Hirsch | 210/519 X |
| 3,522,881 | 8/1970 | Nicol | 210/127 |
| 3,532,218 | 10/1970 | Blottnitz et al. | 210/519 X |
| 3,840,216 | 10/1974 | Smith et al. | 261/DIG. 25 |
| 4,085,050 | 4/1978 | Gervasi | 210/332 |
| 4,183,787 | 1/1980 | Roesler et al. | 261/77 |

*Primary Examiner*—John Adee
*Attorney, Agent, or Firm*—Edmond T. Patnaude

[57] ABSTRACT

Liquid is circulated from bottom to top in a pressure tank by means of a gas pump including an upstanding pipe located within the tank and up through which gas is pumped at a pressure exceeding tank pressure to carry liquid which enters the pipe at the bottom up to the top of the tank.

20 Claims, 7 Drawing Figures

LIQUID CIRCULATION AND PRESSURE TANKS

The present invention relates in general to the art of handling liquids, and it relates in particular to new and improved methods and apparatus for circulating liquids within pressure tanks of the types used, for example, as filter tanks and as pressure feed tanks.

BACKGROUND OF THE INVENTION

When processing liquid slurries it is usually important that the slurries remain homogeneous to insure uniform treatment of the slurries. Where the solid matter tends to settle out of solution rapidly, it has been necessary to provide mechanical stirrers or other types of agitators, such as recirculating pumps, to prevent such settling. However, such devices have not proven to be effective where abrasive sludges are involved, and the problem is more acute where the settling tends to occur in pressurized tanks or columns.

Pressure filters employing tubular or hollow leaf type filter elements have many advantageous features relative to other types of liquid clarifiers. However, where highly viscous liquid filtrates are involved, the flow rates are necessarily low wherefor the retention times in the filters are high. Consequently, settling of the solids within the filters is in many cases a serious problem which results in non-uniform flow through the filter elements.

Another settling problem may occur when thick sludges or the like are moved through a processing system. Such systems commonly employ a pressurizable feed tank which is initially filled with a quantity of the sludge or liquid to be processed. The tank is pressurized with a suitable gas to force the sludge from the feed tank through the system. The retention time in the feed tank may be relatively long and relatively high pressures of several atmospheres may be used in such systems. Because of the highly abrasive nature of many sludges, and because of the high pressures involved, conventional pumps for recirculating the contents of the feed tanks leave much to be desired.

It is known in the prior art to recirculate a liquid in an open tank by means of a gas operated pump wherein a pressurized gas is fed into the lower end of a riser tube having its upper end open at a location above the liquid level in the tank. Where high tank pressures are involved, however, the quantities of gas required and the large pump sizes required to pump such large amounts of gas make such systems impractical.

SUMMARY OF THE INVENTION

Briefly, in accordance with a preferred embodiment of the present invention the liquid contained in a pressure feed tank is recirculated within the tank by recirculating gas contained in the tank above the liquid into the lower end portion of an upstanding pipe which is open above the liquid level in the tank and also open near the bottom. The gas is thus recirculated from the top to the bottom of the tank through a gas pump, which may be mounted internally or externally of the tank, whereby the gas inlet pressure to the bottom of the pipe exceeds the pressure within the tank. Inasmuch as the outlet pressure from the pump need be only a few p.s.i. greater than the inlet pressure, a relatively small pump may be used. Moreover, since the gas is recirculated, the amount of gas required is relatively small.

When the tank is a pressure feed tank in which the liquid level may change, at least the upper portion of the upstanding pipe is fenestrated so that the surface liquid in the tank remains in direct communication with the liquid in the pipe as the liquid level drops. The gas being pumped into the bottom portion of the pipe educts liquid from the bottom of the tank and carries it upwardly from the bottom of the tank to the liquid surface. As a consequence, the gas which is used to pressurize the feed tank also effects a recirculation of the liquid from the bottom to the top of the tank thereby offsetting the tendency of the solids to settle to the bottom of the feed tank.

When the tank is a pressure tank containing pressure type filter elements, wherefor the liquid level remains substantially constant, the upstanding pipe need not be provided with intermediately disposed perforations, but may be open at the top and bottom only. The opening at the top is preferably above the tops of the filter elements, but below the surface of the liquid. In addition, means are provided for dispersing or spreading the filtrate exiting the top of the pipe over the filter elements.

GENERAL DESCRIPTION OF THE DRAWING

The present invention will be better understood by a reading of the following detailed description taken in connection with the accompanying drawing wherein.

DETAILED DESCRIPTION OF THE PREFERRED EMBODIMENTS OF THE INVENTION

Figure 1:
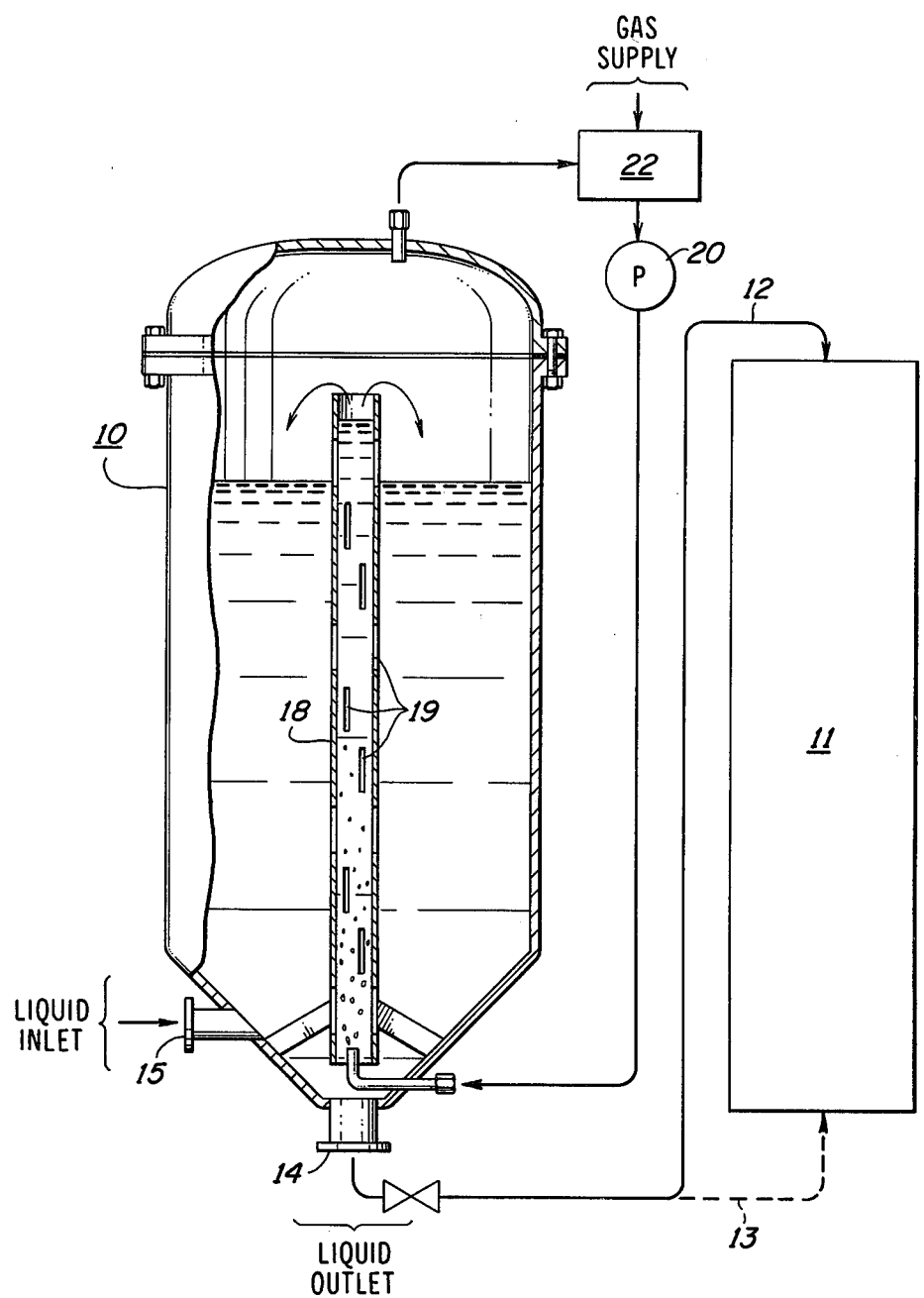
FIG. 1 is a partly sectioned, elevational view of a liquid feed tank and associated system embodying the present invention.

Referring to FIG. 1, there is shown, in somewhat schematic form, a feed system including a pressure tank 10 for feeding liquid to a second tank 11 or other suitable receptacle. A liquid outlet 14 is provided at the bottom of the feed tank 10 and may be connected to the top of the tank 11 as shown by the solid line 12 or to the bottom of the tank 11 as shown by the dotted line 13. The liquid to be fed to the tank is supplied to the feed tank 10 through a liquid inlet 15. Although the inlet 15 is shown near the bottom, its preferred location will vary with the overall tank design and with the material being fed. In some cases, the liquid inlet should be at the top to prevent short cycling between the liquid inlet and liquid outlet.

In accordance with one aspect of the present invention, gas is supplied to the tank 10 to circulate the liquid within the tank 10 to prevent solids suspended in the liquid from settling to the bottom of the tank. More particularly, a riser tube or pipe 18 is mounted along the central vertical axis of the tank 10, and the gas which is used to pressurize the tank is introduced into the bottom of the pipe 18 at a pressure exceeding the pressure in the tank. The pipe 18 is provided with perforations 19 throughout its length and is open at the bottom to the chamber within the tank. As the gas bubbles up through the pipe 18, liquid is carried from the bottom of the tank up through the pipe 18 and exits the pipe at the top through the perforations 19 above the liquid level in the tank. As shown in the drawing, the liquid level in the pipe 18 is higher than that in the main feed chamber.

The perforations 19 are required if the liquid level in the tank is variable inasmuch as the liquid head which can be sustained by the upward flow of gas in the pipe 18 is limited. If, however, the liquid level is maintained at no more than a few inches below the top of the pipe 18, the pipe 18 can be imperforate.

For many applications the pressure in the tank must be relatively high, say two or more atmospheres. In accordance with this invention the gas is supplied to the tank at a pressure exceeding the tank pressure by recirculating gas from the top of the tank 10 through a gas pump 20 to the inlet at the bottom of the tank. The gas may be supplied to the pump 20 through a makeup control 22 which adds gas to the system to replace the gas which is adsorbed by the liquid in the tank. Also, a gas dryer or vapor separator may be used upstream of the pump to remove any liquid entrained in the gas stream before it enters the pump 20. If desired, the pump 20 may be located within the tank 10 to reduce the pressure requirements of the pump housing, particularly where very high feed pressures are involved.

Figure 2:
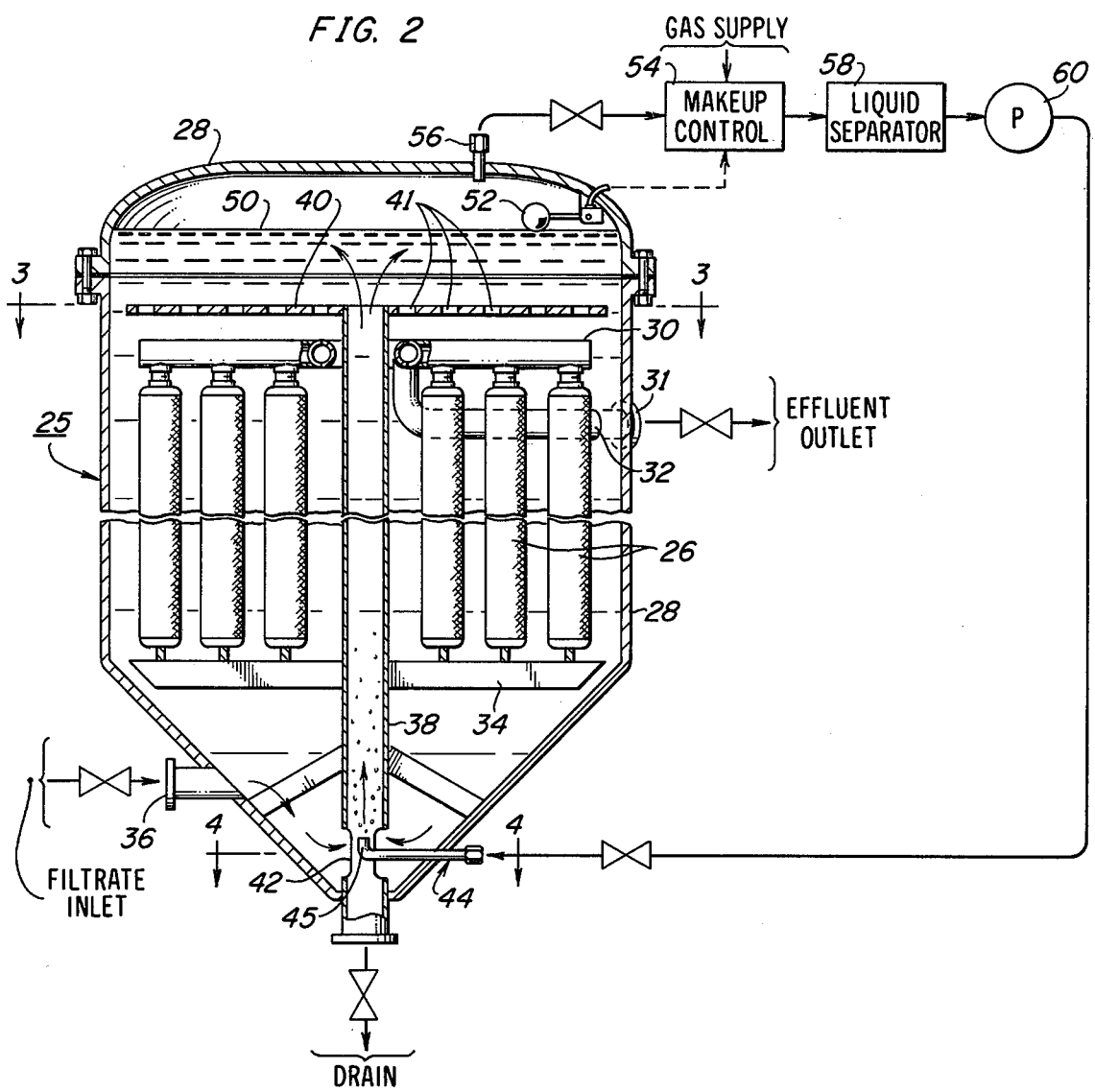
FIG. 2 is a partly sectioned, elevational view of a pressure filter embodying the present invention.

Referring now to FIG. 2, there is shown another embodiment of the invention. It is used for circulating liquid within the filter chamber of a pressure filter 25. As shown, the filter 25 employs a plurality of tubular filter elements 26 such as those described in U.S. Pat. Nos. 3,240,347, 3,244,286, and 3,695,443, but the invention can be adapted for use with other types of pressure filters including, for example, pressure leaf filters and non-pressure filters.

The filter 25 includes a tank 28 having a cover sealably mounted thereto in the customary manner. A manifold 30 is suitably mounted near the top of the tank 28 and is connected to an effluent outlet 31 by a conduit 32. The manifold 30 may be of any suitable type such as, for example, the manifold described in U.S. Pat. No. 3,244,286. The filter elements are supported by the manifold and the cavities within the filter elements communicate with the chamber in the manifold. A spacer grid 34 is provided at the bottom for holding the bottoms of the filter elements in fixed relative relationship. U.S. Pat. No. 3,244,286 describes a spacer grid construction of a type which may be used in the filter 25.

In a normal filtering cycle, a prefilt liquid containing a filter-aid such as diatomaceous earth is pumped into the tank through an inlet 36. As the liquid flows through the filter elements to the outlet manifold 30, the filter-aid particles are deposited on the surfaces of the filter elements to form a porous filtering medium on each element. After a precoat layer of suitable thickness has been deposited on the filter elements, the filter 25 is connected on-line and the liquid to be filtered enters the tank through the inlet 36. The clarified effluent exits through the outlet 31.

In many filter applications the retention time in the filter tank is relatively long and may result in an excessive amount of settling within the filter tank. Attempts to solve this problem have not been entirely successful where, for example, the filtrate is highly abrasive and subject to rapid settling. In accordance with another aspect of the present invention this problem is alleviated by continually recirculating the filtrate within the tank 28 by means of a fluid or gas pump mounted within the tank.

Figure 3:
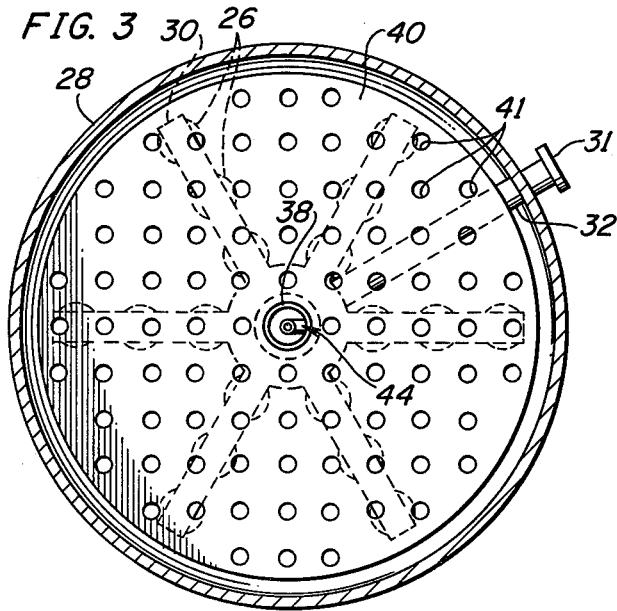
FIG. 3 is a sectional view taken along the line 3—3 of FIG. 2.
Figure 4:
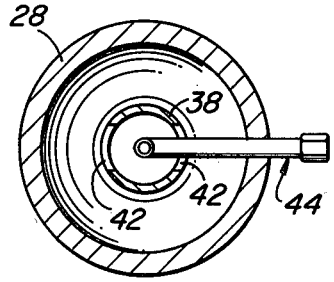
FIG. 4 is a sectional view taken along the line 4—4 of FIG. 2.

As shown in FIGS. 2 and 3, a riser pipe 38 is mounted along the central vertical axis of the tank 28. The pipe 38 has an open top located above the manifold 30, and a spreader plate 40 provided with a plurality of holes 41 is mounted to the pipe 38 above the manifold. A plurality of openings 42 are provided in the pipe 38 near the bottom of the tank, and a gas inlet conduit 44 extends from the wall of the tank into the pipe 38. The inner end 45 of the conduit 44 is upturned so that the gas from the conduit is directed upwardly along the central longitudinal axis of the pipe 38. As the gas travels up through the pipe 38 the heavy bottom liquid is educted into the pipe 38 through the openings 42 and is carried to the top where it flows out over the spreader plate 40 and descends through the openings 41 for distribution to the filter elements.

It should be noted that in this embodiment of the invention the pipe 38 need not be fenestrated inasmuch as the liquid level in the tank is maintained a sufficient distance above the open top of the pipe 38 to prevent the gas bubbles from breaking out of the liquid before the liquid has been carried out of the top of the pipe 38. The liquid level is held constant at, for example, level 50 by controlling the amount of gas fed into the tank in relation to the liquid level. Accordingly, a float 52 controls a makeup valve 54 which supplies gas to the system when the liquid level falls below a predetermined height.

As may be seen from an inspection of FIG. 2, gas is recirculated from an outlet 56 in the cover 28 through the makeup control 54, a liquid or vapor separator 58 and a gas pump 60. Preferably, the controls and the pump are located above the tank so that any liquid entrained in the gas exiting the tank and which is collected in the separator 58 or in the lines thereto tends to flow back into the tank. This gas, which must be compatible with the material being filtered, is supplied to the tank at a pressure exceeding tank pressure. The liquid filtrate preferably enters the tank 28 near the bottom so as to aid in breaking up the heavy liquid or sludge which is settling to the bottom. If desired, however, the filtrate and the gas can be fed coaxially into the lower end of the riser pipe 38.

Figure 5:
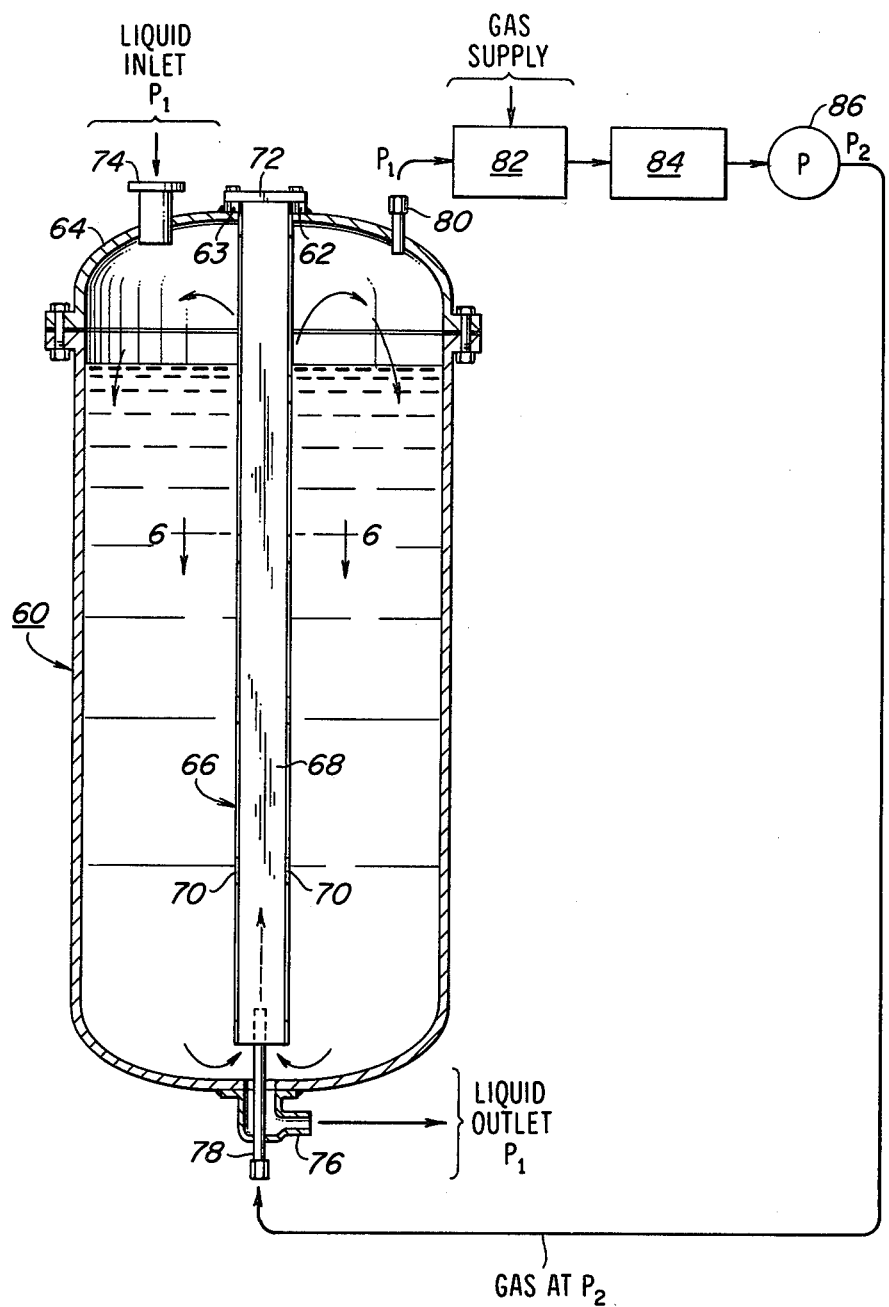
FIG. 5 is a partly cross-sectioned elevational view of a pressure feed tank and associated system embodying another aspect of the present invention.
Figure 6:
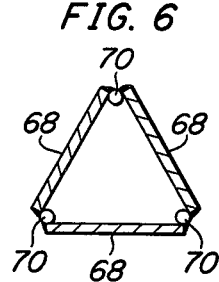
FIG. 6 is a cross-sectional view taken along the line 6—6 of FIG. 5.
Figure 7:
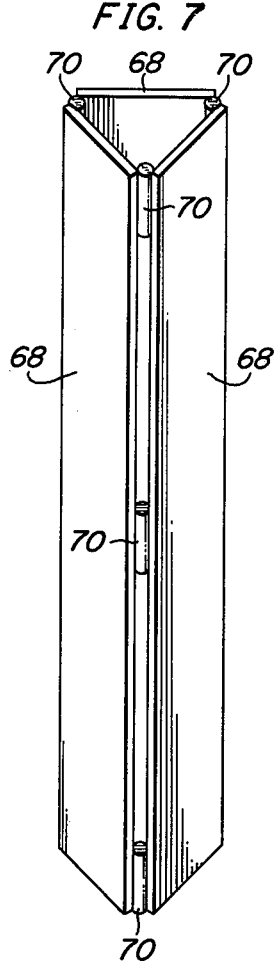
FIG. 7 is a perspective view of the riser tube incorporated in the feed tank of FIG. 5.

Referring to FIG. 5, there is shown a pressure feed tank 60 constituting still another embodiment of the invention. As there shown, a flange 62 surrounds a large central opening 63 in the cover 64 of the tank. A rigid fenestrated tube assembly 66 is suspended from the flange 62 and extends along the central vertical axis of the tank. With further reference to FIGS. 6 and 7, the tube assembly 66 comprises a plurality of rectangular metal plates 68, and a plurality of short rods 70 welded to the plates to form an elongated tube which is triangular in cross-section. It may be seen that this tube is provided with open corners except at the locations of the rods 70. The tops of the three plates 68 are welded to the bottom of a plate 72 which is bolted to the flange 62 over a suitable sealing gasket. The principal advantage of the tube assembly 66 over a pipe having holes machined therein is one of cost.

The tank 60 has a liquid inlet 74 at the top and a liquid outlet 76 at the bottom. Gas is supplied through a conduit 78 which extends upwardly along the central vertical axis of the tank 60 into the pipe assembly 66. A gas outlet 80 at the top feeds gas through a gas makeup control 82, a liquid separator 84 which removes entrained liquid from the gas and a pump 86 which increases the gas pressure and supplies it to the conduit 78. The gas which thus enters the riser tube assembly 66 recirculates the liquid in the tank and raises the liquid within the tube 66 to a level greater than the liquid level in the main section of the tank. While the liquid inlet 74 is shown at the top, this is not cirtical, as it may open into the tank wherever desired.

It may thus be seen that in each of the embodiments of the invention illustrated in FIGS. 1, 2, and 5, the liquid in the respective tank is circulated from bottom to top within the tank by a fluid or gas pump. The gas is recirculated through a pump which increases the gas pressure to a value greater than the pressure in the tank. When the invention is incorporated in a pressure filter, the gas which causes liquid circulation within the filter chamber may also be used to control the level of liquid in the chamber.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A method of circulating a liquid contained in a sealed tank having an internal pressure greater than atmospheric pressure, comprising
   mounting a tube in an upright position in said tank,
   said tube having an upper opening therein located within said tank above the level of liquid in said tank,
   said tube having a lower opening therein located below the level of liquid in said tank and in proximity to the bottom of said tank, and
   pump means for pumping gas from a location in said tank above the level of liquid in said tank into the lower part of said tube to draw liquid into said tube through said lower opening and to discharge liquid from said tube through said upper opening,
   whereby the liquid in said tank is circulated from the bottom to the top of the body of liquid contained therein.

2. A method according to claim 1 wherein said tube is fenestrated.

3. A method according to claim 1 comprising the steps of
   mounting a plurality of filter elements around said tube in said tank with the tops of said filter elements being lower than said upper opening in said tube.

4. A system for moving a dense, viscuous material from one location to another comprising
   a hermetically sealable receptacle defining a chamber and having a bottom outlet connected to another location,
   means for supplying said material to said receptacle,
   a rigid tube mounted in an upright position in said receptacle, the bottom of said tube being open and in proximity to the bottom of said receptacle and
   means for supplying gas to the bottom of said tube at a pressure exceeding the pressure in said chamber,
   whereby liquid is recirculated from the bottom to the top of said receptacle through said tube, and said gas forces liquid from said receptacle through said outlet to said another location.

5. A system according to claim 4 wherein said means for supplying gas comprises
   pump means having its inlet connected to the upper portion of said tank and having its outlet connected to the bottom of said tube.

6. A system according to claim 5 comprising
   means for supplying additional gas to the inlet of said pump means.

7. A system according to claim 6 wherein
   said tube is suspended from the top of said tank.

8. A system according to claim 5 wherein said means for supplying gas comprises
   conduit means extending into the lower portion of said tube and having an open distal end pointing upwardly in said tube.

9. A system according to claim 4 wherein said tube is fenestrated.

10. In combination
    a sealable tank having a product inlet and a product outlet,
    said product outlet being located in proximity to the bottom of said tank,
    a fenestrated pipe extending upwardly in said tank,
    a gas inlet opening into said tank,
    conduit means connecting said inlet to a location within and near the bottom of said pipe, and
    pump means for pumping gas from the upper portion of said tank and into the lower portion of said tank through said product outlet and said gas inlet.

11. A filter, comprising
    a tank having a filter chamber therein,
    liquid inlet means for supplying a liquid filtrate to said chamber,
    filter means disposed in said chamber for removing entrained particles from a liquid passed through said filter means,
    effluent outlet means connected to said filter means,
    an upstanding tube in said chamber,
    said tube being open to said chamber above said filter means and also being open to said chamber below said filter means, and
    means for supplying gas under pressure to the lower end portion of said tube to pump liquid from said chamber below said filter means up through said tube,
    whereby the liquid in said chamber is recirculated within said tank.

12. A filter according to claim 11 comprising
    spreader means extending across the top of said filter means for distributing liquid flowing from said tube to said chamber.

13. A filter according to claim 11 comprising
    control means for maintaining the liquid level in said chamber above the opening at the top of said tube.

14. A filter according to claim 13 wherein said control means comprises
    pumping means for pumping gas into said chamber.

15. A filter according to claim 14 wherein said control means comprises
    means responsive to the level of liquid in said chamber for feeding additional gas to said pumping means when said level is less than a predetermined height.

16. A filter according to claim 11 wherein said filter means comprises
an outlet manifold, and
a plurality of filter elements mounted to said manifold.

17. A filter according to claim 16 wherein said filter elements are perforated tubes suspended from said manifold.

18. A filter according to claim 17 wherein said filter elements are disposed around said upstanding tube in parallel relationship therewith.

19. A filter, comprising
a tank having a filter chamber therein,
liquid inlet means for supplying a liquid filtrate to said chamber,
an outlet manifold,
a plurality of filter tubes suspended from said manifold in said chamber for removing entrained particles from a liquid passed through said filter means,
an upstanding tube in said chamber,
said upstanding tube being open to said chamber above said filter tubes and also being open to said chamber below said filter tubes,
spreader means extending across the top of said filter tubes for distributing liquid flowing from said upstanding tube to said chamber, and
means for supplying gas under pressure to the lower end portion of said upstanding tube to pump liquid from said chamber below said filter tubes up through said upstanding tube,
whereby the liquid in said chamber is recirculated within said tank.

20. A filter, comprising
a tank having a filter chamber therein, containing a gas and a liquid, the pressure in said chamber being above atmospheric pressure,
liquid inlet means for supplying a liquid filtrate to said chamber,
filter means disposed in said chamber for removing entrained particles from a liquid passed through said filter means,
effluent outlet means connected to said filter means,
an upstanding tube in said chamber,
said tube being open to said chamber above said filter means and also being open to said chamber below said filter means, and
means for pumping gas from the portion of said chamber above said liquid to the lower portion of said tube to pump liquid from the portion of said chamber below said filter means to a location in said chamber above said filter means.

* * * * *